United States Patent [19]
Sanna et al.

[11] 4,068,394
[45] Jan. 17, 1978

[54] V-BELT DEMONSTRATOR DEVICE

[75] Inventors: Waldo A. Sanna; Carl A. Sand, both of Cincinnati, Ohio

[73] Assignee: Dayco Corporation, Dayton, Ohio

[21] Appl. No.: 785,159

[22] Filed: Apr. 8, 1977

[51] Int. Cl.² .................................................. G09B 25/00
[52] U.S. Cl. ................................................. 35/50; 73/9
[58] Field of Search .............................. 35/49, 50; 73/9

[56] References Cited

U.S. PATENT DOCUMENTS

| 1,242,863 | 10/1917 | Reeves | 35/50 |
| 1,627,125 | 5/1927 | Stuart | 35/50 |
| 2,109,171 | 2/1938 | Gould | 35/50 |
| 2,603,084 | 7/1952 | Waddell | 73/9 X |

FOREIGN PATENT DOCUMENTS

| 260,530 | 11/1926 | United Kingdom | 73/9 |
| 770,951 | 3/1957 | United Kingdom | 73/9 |

Primary Examiner—Harland S. Skogquist
Attorney, Agent, or Firm—Reuben Wolk

[57] ABSTRACT

A device for demonstrating the coefficient of friction of a V-belt. Two dissimilar V-belt segments are secured together with a tension spring to form a continuous loop, the segments engaging aligned pulleys. Manual rotation of the pulleys applies frictional force to the side faces of the belt segments to indicate comparative slippage of each segment.

10 Claims, 3 Drawing Figures

U.S. Patent    Jan. 17, 1978    4,068,394
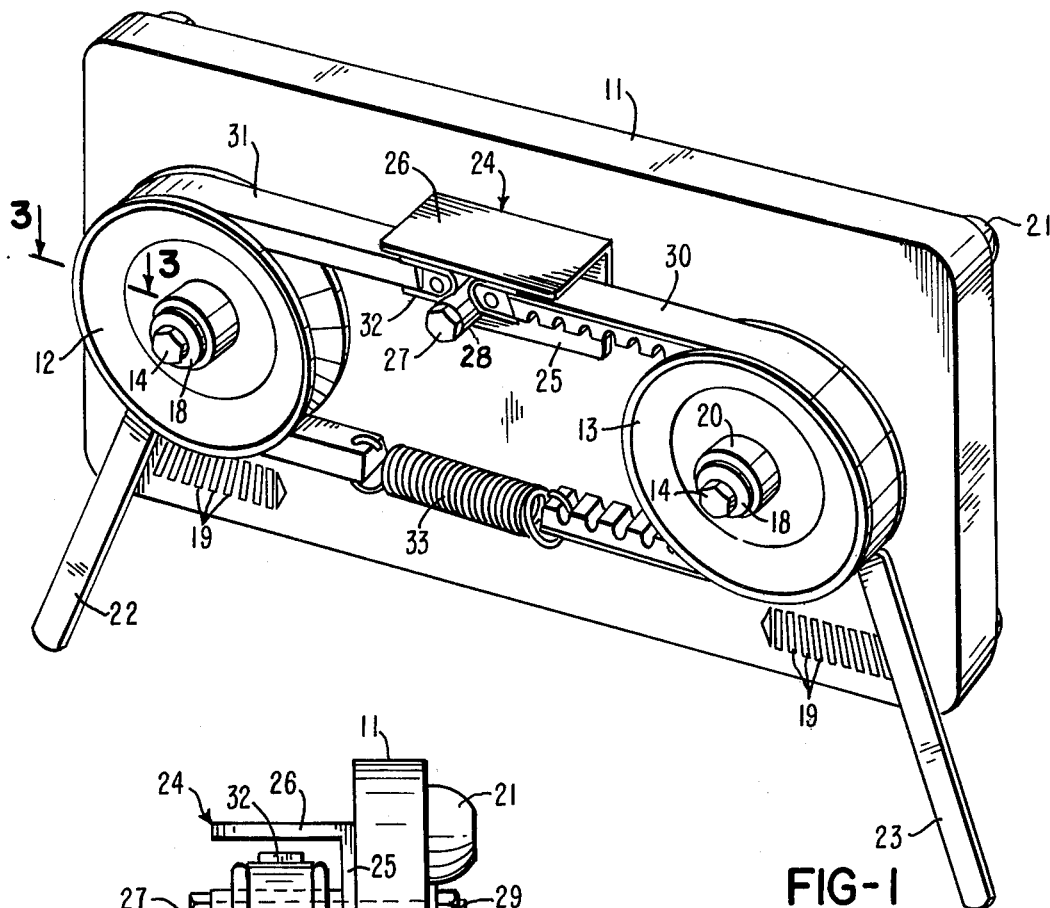
FIG-1
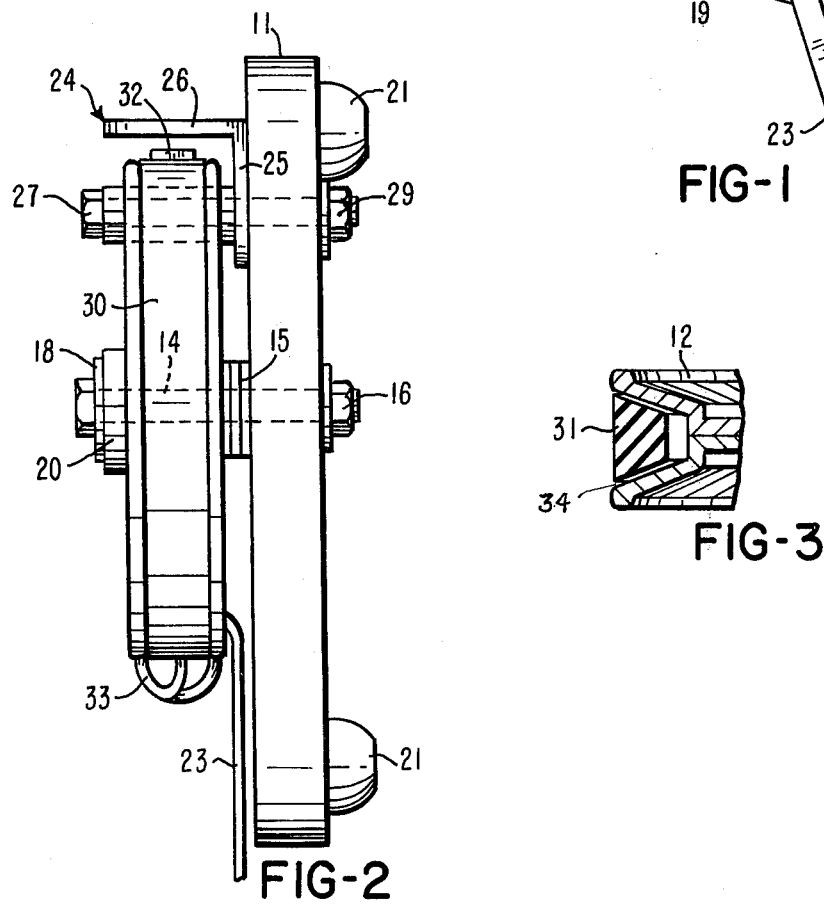
FIG-2
FIG-3

4,068,394

V-BELT DEMONSTRATOR DEVICE

BACKGROUND OF THE INVENTION

V-belts, or power transmission belts, are used to transmit power by means of the frictional engagement of the lateral faces of the belt with grooves of pulleys. Many different types of V-belts have been designed for various uses, and therefore are capable of different frictional characteristics. It is frequently desired to demonstrate the frictional characteristics of such a belt by using a device that is simple, yet effective.

SUMMARY

According to the present invention, the coefficient of friction of any desired belt may be easily demonstrated by a test which compares its frictional characteristics with a belt having different frictional characteristics. By applying the same amount of friction to each of these belts, the comparative slippage of the different belts may be easily demonstrated.

It is a feature of the present invention to provide this comparative effect by means of a simple device utilizing a pair of aligned pulleys which may be manually rotated. By assembling two dissimilar belt segments with a connector and with a tension spring, a continuous loop is formed in which each belt segment engages a different pulley. Application of frictional engagement through the pulley groove to the belt will clearly demonstrate the amount of slippage in a comparative manner.

Further details of the invention will become readily apparent from the embodiment described below.

BRIEF DESCRIPTION OF THE DRAWING

FIG. 1 is a perspective view of the novel device with the belt segments to be tested placed in operating position.

FIG. 2 is a side view of the device illustrating further details of the invention.

FIG. 3 is a cross section taken through a pulley and V-belt segment further illustrating the relationship therebetween.

DESCRIPTION OF THE PREFERRED EMBODIMENT

The demonstrator device consists essentially of a rectangularly shaped supporting body 11 upon which are mounted a pair of pulleys, 12 and 13, of conventional construction, each having a groove with beveled sides for receiving a V-belt. These pulleys are mounted upon the body 11 by means of bolts 14 and secured to the body by means of the nuts 16. Bushings 15 are mounted on the bolts between the pulleys and the body, so that the pulleys are spaced away from the body to permit free rotation. This free rotation is enhanced by the use of washers 18 under the head of the bolt 14, and by the use of collars 20 between the washers and the pulley. Secured directly to the pulleys are handles 22 and 23 by which the pulleys may be rotated. Mounted directly below each pulley is a series of markings 19 used as indicators which will provide comparative locating positions of the handles 22 and 23. Also mounted on the base of the body 11 are supporting feet 21 to permit the device to be laid flat during operation.

Also mounted on the body 11 is a bracket 24 which is located above and between the two pulleys. The bracket has a flange 25 which is flush with the surface of the body, and is secured thereto by means of bolt 27, bushing 28, and nut 29. The other flange 26 of the bracket extends outwardly from the body.

The V-belt to be tested is designated by reference No. 30, while the comparative belt segment is designated by reference No. 31. These segments are interconnected at one end by means of a belt connector 32, which is secured to each of the belt ends by means known in the art; for example, as shown in U.S. Pat. No. 2,796,911. The other end of the belt segments are interconnected by means of a tension spring 33 which has a predetermined tension in the range of 0.05 to 8.0 poinds per square inch. The belt segments, the tension spring, and the connector thus form an assembly which is passed around the pulleys in a continuous loop. The connector acts as a locking device against the bolt 27 so that the upper connection of the belt segments is secured in place and will not tend to move. Explanation of this feature is detailed below.

OPERATION

When it is desired to utilize the demonstrator device, the handles 22 and 23 will be rotated approximately to the position shown in FIG. 1 in which the inner edges of the handles are approximately aligned with the outermost portions of the markings 19. The assembly comprising belt segments 30 and 31, which have been previously interconnected by means of the connector 32 and spring 33 will then be placed in the position shown in FIG. 1 so that the connector is locked in place over the bushing 28. The flange 26 helps prevent the connector from becoming dislodged. If desired to improve the locking feature, the bolt 27 and bushing 28 may be moved closer to the flange 26 so that the belt connector will actually be wedged between the bushing and the flange. Thus, the bushing acts as a locking means to provide a fixed reference point for the assembly.

The belt segments are now placed in demonstrating position with the segments engaging approximately 180° of the pulley grooves, and in order to demonstrate the coefficient of friction of the belt 30, both handles are moved toward each other with normal hand pressure. In the arrangement illustrated, the belt segment 30 has a higher coefficient of friction than does belt segment 31, and therefore it is virtually impossible to move the handle 23. However, the handle 22 can be easily moved inwardly because of the greater slippage of the belt segment 31 with respect to the flange of the pulley 12. The slippage is illustrated in somewhat exaggerated fashion in FIG. 3 by showing a space 34 between the belt segment and the pulley flange in order to demonstrate the concept of slippage which occurs with the belt of a lower coefficient of friction. The movement of the handle 22 past its markings 19 may be used as a general indicator of the ease of movement compared to the position of the handle 23.

Because of various types of belt segments which are to be demonstrated, it should be understood that varying frictional characteristics may exist. For this reason the device is constructed so that the spring 33 may be easily changed to provide a spring of higher or lower tension. This may be easily accomplished by detaching the entire belt assembly from the demonstrator device and removing the spring by simply slipping the loop ends of the spring out of the holes in the belt segments, whereupon a different spring may be installed. It has been found that the maximum spring tension should be 8 pounds per square inch; if any greater tension is used, neither of the handles will move and the demonstration will fail. On the other hand, if the tension is less than 0.5 pounds per square inch, there may be insufficient tension on either segment to demonstrate the high coefficient of friction and both of the handles will move.

It should also be understood that a very slight adjustment in spring tension may be achieved by bending the loops, if desired.

The simple design of the device lends itself to quick installation and removal of the belt. Another advantage of this feature lies in the fact that a skeptical viewer may question whether one of the pulleys is locked more tightly to the body than is the other. This doubt is easily dispelled by removing the belt assembly and reversing it so that the segment 30 is on the left and the segment 31 is on the right rather than the positions illustrated in FIG. 1. Movement of the handles as before will then demonstrate the fact that it is the belt being demonstrated, namely segment 30, which has the greater coefficient of friction.

The device also lends itself to easy handling and storage. When the belt assembly is removed, the handles 22 and 23 may be freely rotated since there is no frictional load on the pulleys. The handles may thus be swung inward so that they lie within the confines of the body 11, rather than extending beyond the body as illustrated in FIG. 1.

While the embodiment shown in the drawings and described above is illustrative of the present invention, changes in the embodiment may be made and practiced within the scope of the invention and the claims.

What is claimed is:

1. A device for demonstrating coefficient of friction of a V-belt comprising a pair of aligned grooved pulleys; an assembly consisting of two dissimilar V-belt segments, a connector securing one end of each segment together, and a tension member securing the other end of each segment together; said assembly passing around said pulleys so that each segment engages a different pulley, and means for rotating each of said pulleys to apply frictional forces to said segments whereby the comparative slippage between each pulley and its corresponding segment provides an indication of the relative frictional characteristics of said segments.

2. The device of claim 1 in which said segments have lateral driving faces frictionally engaging approximately 180° of said pulley grooves.

3. The device of claim 1 including a supporting body, said pulleys being mounted on said body, and locking means also being mounted on said body, said connector engaging said locking means and providing a fixed reference point for said assembly.

4. The device of claim 1 in which said tension device applies a tension to said belt segments between 0.5 and 8.0 pounds per square inch.

5. The device of claim 4 in which said tension device is a spring.

6. A method of demonstrating coefficient of friction of a V-belt comprising the steps of assembling a segment of said belt with a segment of a dissimilar belt, engaging a pair of aligned grooved pulleys so that each segment engages a different pulley, rotating said pulleys to apply frictional forces to said segments, and moving one of said segments relative to the other to demonstrate comparative slippage between each pulley and its corresponding segment as an indication of relative frictional characteristics of said segments.

7. The method of claim 6 including the steps of frictionally engaging the grooves of said pulleys with lateral driving faces of said belt segments.

8. The method of claim 6 including the step of assembling a tension device with said segments.

9. The method of claim 8 including the steps of connecting one end of each segment by means of said tension device and connecting the other ends of each segment by means of a connector.

10. The method of claim 9 including the steps of mounting said pulleys on a supporting body, mounting a locking means on said body, and engaging said locking means with said connector to provide a fixed reference point for said assembly during rotation of said pulleys.

* * * * *